March 21, 1961  A. G. BODINE  2,975,751
METHOD AND APPARATUS FOR ENVIRONMENTAL
NOISE GENERATION
Filed May 6, 1957  3 Sheets-Sheet 1

*INVENTOR.*
ALBERT G. BODINE
BY
ATTORNEY

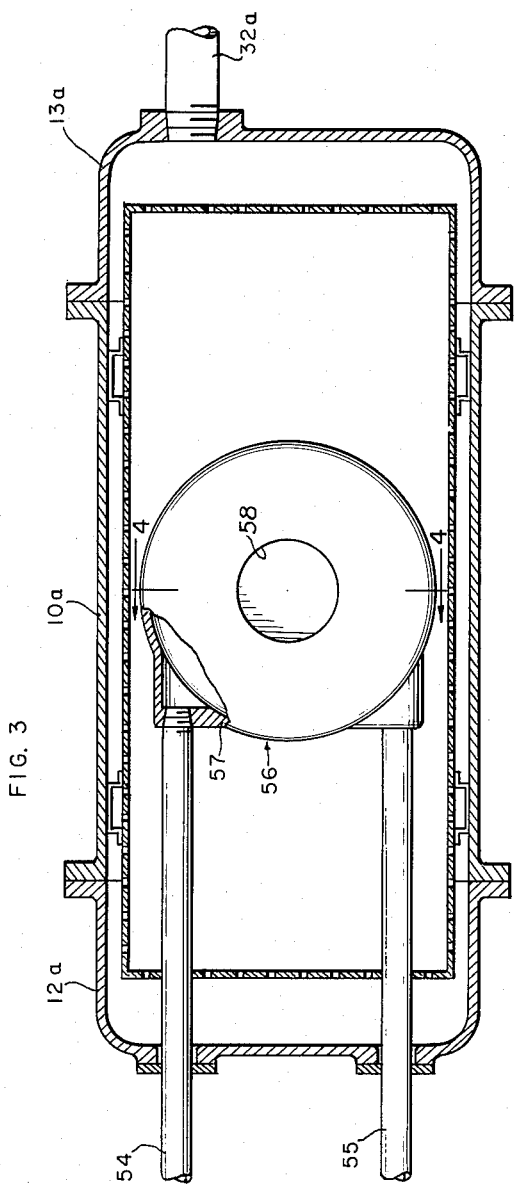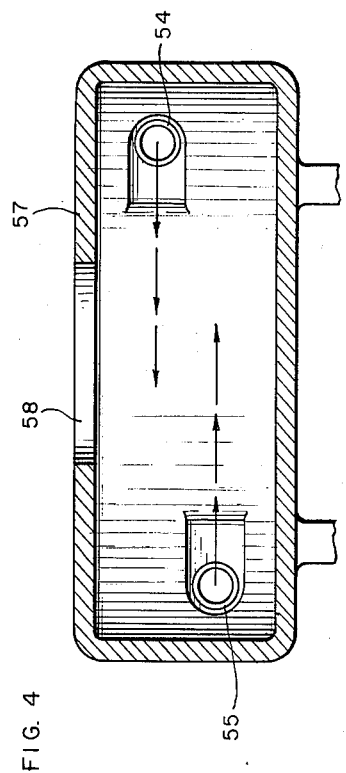

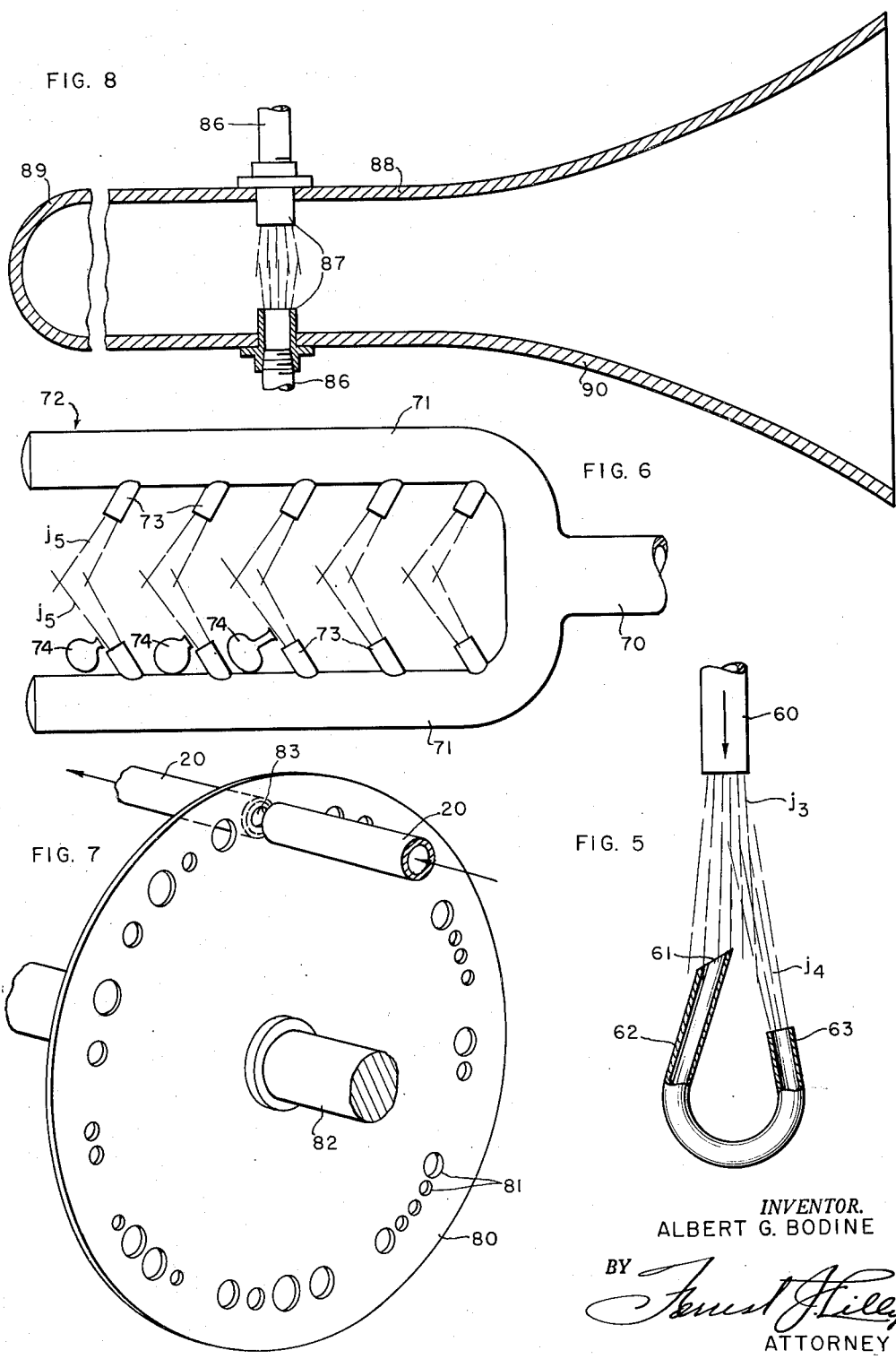

United States Patent Office 2,975,751
Patented Mar. 21, 1961

2,975,751

METHOD AND APPARATUS FOR ENVIRONMENTAL NOISE GENERATION

Albert G. Bodine, Van Nuys, Calif.
(13120 Moorpark St., Sherman Oaks, Calif.)

Filed May 6, 1957, Ser. No. 657,163

18 Claims. (Cl. 116—137)

This invention relates generally to sound generators, and more particularly to broad frequency band noise generators designed for use in testing various devices in a high amplitude noise environment. The sound spectrum generated, consisting of virtually an infinite number of frequencies, is sometimes referred to as "white" sound, and it is a primary object of the invention to provide a unique method of generating white sound, and a unique source of white sound, useful in environmental testing.

Recent increases in speed and power for air-borne vehicles, such as jet aircraft and missiles, have brought forth extremely serious problems owing to disproportionate increases in noise generation and the effect thereof on the aircraft and its components. The powerful propulsion sources themselves develop extremely high-energy noise, owing partly to acoustic phenomena connected with internal combustion, and partly to the action of the rearwardly flowing jet as it shears its way into the surrounding atmosphere. In addition to this propulsion noise, additional noise results from the vehicle cutting through the air at high velocity.

As mentioned above, the disproportionate increase in noise generation with increased velocity begins to occur at the typical air velocities experienced in connection with jet aircraft. Many authorities have dealt with that aspect of the problem. A typical example reported in the literature is a five-fold increase in such sound generation with a velocity increase from 600 to 1000 feet per second. The intense noise field generated by such a vehicle creates serious problems owing to the action of this noise field upon the vehicle structure and its control mechanisms and instrumentation. Panels and framework fatigue as a result of acoustic vibration. Many of the well-known guidance mechanisms, such as gyros, wear out rapidly under the influence of high frequency acoustic vibration. Many of the mechanisms malfunction because of the physical vibration and pulsating atmospheric pressure caused by the sound field. Condensers in electronic circuits, under the influence of fluctuating ambient pressure, act as frequency modulating microphones. Many micro-sized elements such as microswitches and miniature relays become erratic. Vacuum tube elements vibrate and generate electric pulsations in their connected circuits. Guidance systems as a whole become erratic and undependable.

Manufacturers and users of aircraft equipment have determined that much of this noise generation is a permanent evil, noise reduction apparently being possible only to a limited extent. Accordingly, a number of committees consisting of panels of acoustic experts, have been established to determine the requirements for structures, mechanisms and instruments to exist and to behave consistently in the unfavorable acoustic environment now at hand.

It has been determined that the only real acoustic difference between the various high speed air-borne vehicles is the intensity of the sound generated thereby. As the vehicles become larger and faster, the sound field becomes more intense, and the intensity increase, unfortunately, rises much faster than the increase in vehicle size and speed. It has been determined that all airborne vehicles generate a broad spectrum of frequencies. With different vehicles, the spectrum varies as regards emphasis of intensity in different frequency ranges, but this variation is only a small matter of degree. It has been determined that air-borne vehicles generate a form of "white" sound, meaning virtually an infinite number of frequencies within the spectrum, and further, that sound amplitude at different frequencies within the spectrum has a random distribution.

It has been determined by those concerned with the problem that the electronic equipment, servomechanisms, control apparatus, and structural elements must be designed and/or mounted to function properly, in the very high intensity sound field encountered, viz., upwards of 150 decibels, throughout a frequency range of from a few cycles per second up to 10,000 cycles per second or more. This determination is being translated, in effect, into a materiel specification.

The problem now facing the industry is: how to pretest such aircraft components with reasonable facility and in a thoroughly practical manner so that they will be known to be reliable when exposed to the known sound field while operated in the air-borne vehicle. It is impractical to divert highly expensive, modern air-borne vehicles to the testing of each of the many components going into its various mechanisms and instruments. Accordingly, the need has arisen for a component test facility which will generate the kind of sound field in which the component will eventually be called upon to function, and it is a primary object of the invention to provide such a facility.

A further object of the invention is the provision of an environmental sound test facility which will generate the requisite sound field in such a way that various aircraft components can be located therein and separately tested for performance. Otherwise phrased, it is an object of the invention to provide a sound chamber in which can be generated a sound field which closely duplicates that encountered in high performance aircraft, and in which various aircraft components can be located while put through their normal functional operation.

A further object is to provide a test facility having a sound chamber so constructed and arranged that elements can be temporarily installed therein with normal necessary connections. That is to say, it is an object to provide, for example, a facility adapted for the environmental acoustic testing of electronic equipment, with provision for suitable circuitry to be connected thereto for various test purposes. For purposes of mechanical mechanisms, it is an object to provide support means for suitable force and motion measuring devices to permit adequate testing of the mechanism in carrying out its normal functions.

A further object is to provide a sound chamber for component testing which adequately isolates the sound field, so that it does not become a nuisance to surrounding personnel and activities.

Broadly, from the standpoint of method, environmental noise generation in accordance with the invention comprises, essentially, effecting a collision between two flowing high velocity bodies or streams of pressurized gas, such as air. In practical apparatus embodiments, the invention further provides means for controlling the relative velocity and the mechanism of contact therebetween. In a preferred form of apparatus, two or more high velocity gas jets are arranged to impinge on one another, and, depending upon impact and/or shear effects therebetween, generate very powerful noise throughout a broad frequency band. With a relative component of opposed jet velocity below Mach 1, the noise amplitude varies with approximately the eighth power of the relative velocity. This is using the conventional notation of Mach number which is the ratio of flow velocity to the speed of sound at that temperature. With a relative velocity above Mach 1, the exponent is more than doubled, and in some instances may approach an exponent of twenty. The invention may employ two or more high velocity jets arranged to scrub or impinge against one another, so that the two colliding jet streams are each broken up into a myriad of random sized and random spaced pressurized air particles, which individually expand or "explode" in the lower pressured atmosphere within the chamber, generating a shower of high amplitude sound waves at virtually an infinite number of frequencies throughout a broad frequency band. Depending upon the characteristics of the jet and the air pressure used, the air particles may initially be in such a highly compressed state as to generate nonlinear or shock waves, each particle, therefore, generating, upon its initial "explosion," a large number of component sinusoidal sound frequencies. Each such exploded particle creates a vacuum pocket, which is then filled by surrounding gas, and a lower frequency gas oscillation then occurs which becomes an exponentially dying source of lower frequency sound. According to one illustrative embodiment of the invention, very effective noise generation is accomplished by use of opposed jets, each having a De Laval expansion nozzle fed with air above 100 p.s.i., affording a relative velocity in excess of Mach 10. Noise generators in accordance with the invention have the unique property of generating the desired type of white sound spectrum, as well as the capability of generating elevated noise levels throughout the spectrum. Moreover, the generator of the invention is easily capable of use within an isolated chamber adapted to receive also the component to be tested.

The invention will be further understood from the following detailed description of a number of illustrative embodiments thereof, reference for this purpose being made to the accompanying drawings, in which:

Fig. 3 is a horizontal section through a sound chamber generally of the type of Fig. 1, and taken as indicated by section lines 3—3 of Fig. 1, but showing an alternative sound generator;

Fig. 4 is a view taken as indicated by line 4—4 of Fig. 3;

Fig. 5 shows alternative nozzles which may be substituted for those shown in Fig. 1;

Fig. 6 is a plan view of an alternative sound generator which may be used in the sound chamber of Fig. 1;

Fig. 7 shows an auxiliary device which may be used, for instance, with the sound chamber of Fig. 1; and Fig. 8 is a view partly in elevation and partly in section showing another embodiment of the invention.

Figure 1:
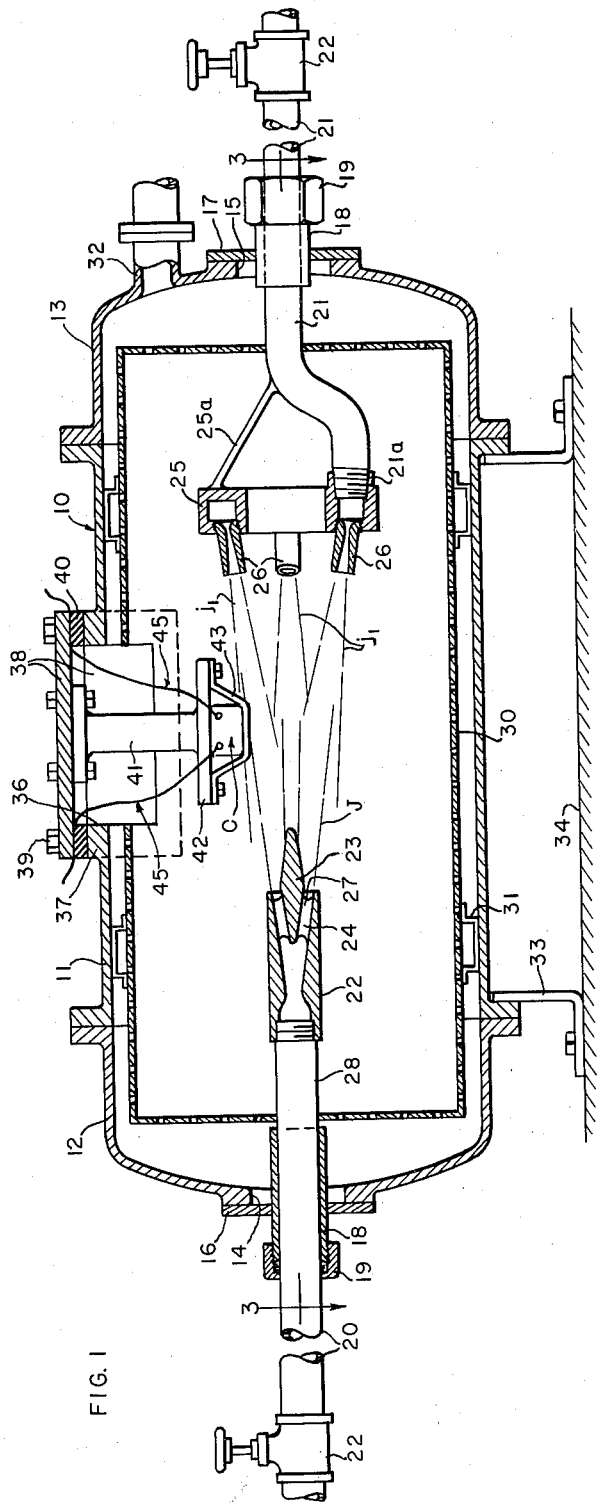
Fig. 1 is a longitudinal medial sectional view of one illustrative embodiment of the invention.

With reference first to the embodiment of the invention shown in Fig. 1, numeral 10 designates generally a sound chamber, made up, in this instance, of a cylinder 11 flange-fitted at its ends to closure heads 12 and 13. Heads 12 and 13 have central apertures 14 and 15, closed by plates 16 and 17, respectively, and tightly fitted in plates 16 and 17 are sleeves 18, which thus protrude into the end portions of the chamber. Slidably arranged in sleeves 18, and packed therein by means of packing glands at 19, are conduits 20 and 21 carrying air or other gas at a typical pressure of, for example, 100 p.s.i., or even higher, and containing control valves 22 by which this pressure may be regulated.

Screwed onto the end of air pressure conduit 20, within chamber 10, is a De Laval nozzle 22, having annularly spaced within its discharge end a diffuser cone 23, which may be mounted as by thin, streamlined webs 24 between it and the nozzle. The other air supply conduit is bent and coupled, as at 21a, into a header annulus 25 positioned concentrically with the opposed nozzle 22, and fitted with a plurality of smaller De Laval nozzles 26, of which four are shown in the present example. The header annulus may be braced by a strut 25a. These nozzles 26 are inclined inwardly toward the longitudinal axis of the system, so as to point toward the annular discharge outlet 27 of nozzle 22. Thus the air jet issuing from nozzle 22 and the air jets $j_1$ issuing from the nozzles 26 impinge upon one another in the central region of the sound chamber.

A perforated or porous cage 30, annularly spaced a short distance inside chamber 10 and positioned by brackets 31, so as to entirely enclose the several nozzles and the space therearound, acts as a sound absorption means and prevents undesirable resonant frequency sound wave patterns within the chamber. Closure head 13 is formed with a gas outlet 32. The sound chamber is further shown as provided with suitable supports 33 resting on base 34.

Cylinder 11 is formed, immediate its ends, and preferably on its top side, with an access window 36, surrounded by a flange 37, and tightly fitted onto this flange is an arcuate closure plate 38, secured down as by screws 39, with a rubber sealing gasket 40 between plate 38 and flange 37. Fastened to the plate 38 is a hanger 41 having, at its lower end, in this instance, a support plate 42 to which the component C to be tested may be secured as by means of strip 43. The hanger 41 is so dimensioned and arranged as to position the component C adjacent the area of impingement of the jets on one another, and thus immediately adjacent the sound field generated by this impingement. The component C may for illustration be assumed to be an electronic instrument, having leads 45. It will be evident that the closure plate 38 may be furnished with insulated terminals to which these leads may be connected inside the chamber, and to which other leads may be connected outside the chamber. It is entirely practicable, however, simply to run the leads 45 out under the rubber sealing gaskets 40, as here illustrated. It will further be understood that in case of testing of mechanical components, the hanger 41 may carry suitable power, test or measurement equipment, properly connected with the component on test; and further, that any necessary power or test leads may be run out from such auxiliary equipment under the rubber gasket 40, which, when fastened down, seals satisfactorily therearound.

The sound generator functions as follows: the gas jets from the De Laval expansion nozzles issue at high velocity, with only moderate pressure reduction, and impinge against one another at high velocity with either a full or partial head-on collision. The higher the pressures behind the gas streams, the higher will be the relative velocities of the impinging jets, and the greater will be the intensity of the sound field. It is noted that with a relative velocity of below Mach 1, the noise intensity varies with approximately the eighth power of the relative velocity; while above Mach 1, the exponent is more than doubled, approaching an exponent of 20. Using De Laval nozzles, fed with air approximately at or above 100 p.s.i., a relative velocity in excess of Mach 10 can theoretically be attained.

The impinging jet streams are broken up into a myriad of random sized and random spaced high pressure air particles. Each such released air particle rapidly expands, or "explodes," in the relatively rarified atmosphere within the chamber, and becomes an individual high intensity sound source, generating a frequency related to its size and state of compression, which are in turn, of course, related to the relative velocity at which the streams are colliding. Highly compressed particles, upon initial "explosion," generate nonlinear or shock waves, each particle, therefore, comprising initially a single source of a large number of sinusoidal sound frequencies. Each such exploded particle tends to "over-expand" in the relative low pressure surrounding atmosphere, and therefore creates a vacuum pocket, which is immediately filled with surrounding gas, and a lower frequency gas oscillation then ensues, and becomes for a short time a source of lower frequency sound. In addition, the shearing action between the jet streams generates vibrating vortices which generate sound by a mechanism which might include acoustic quadrapoles. The over-all result is the generation, in the immediate region of the test component C, of a broad band of a virtually infinite number of sound frequencies, of random amplitude at any given frequency.

The noise generation is controllable as to over-all intensity level, over-all frequency band, and intensity emphasis within the over-all band, in various ways. First of all, adjustments can be made by controlling the pressure of the gas fed to the nozzles. Adjustments in extent of jet contact are accomplished by axially moving the nozzle systems toward or from one another by sliding the conduits 20 and 21 in sleeves 18. As shown, the jets $j_1$ are positioned slightly outside the jets $j$, and it will be seen that the extent of contact can be increased by moving the nozzles further apart. With the nozzles set as shown in Fig. 1, there is partial head-on collision of the jets, and partial scrubbing contact thereof, where portions of oppositely moving jets passing one another are in scrubbing contact, giving somewhat modified noise generation characteristics. Further, adjustments can be made in the angular setting of the nozzles 26. Headers 25 of different angled nozzles may, for example, be interchangeably used; or, the screw-thread coupling portions of the nozzles may be arranged at an angle to the axis of the nozzle opening, and adjustment in angle setting obtained by rotative adjustment of the nozzles in the header.

The component C may be exposed to the sound field for a given time period to discover any deterioration, or may be operated while in the sound field to determine malfunction, vibration, wear, and the like.

Figure 2:
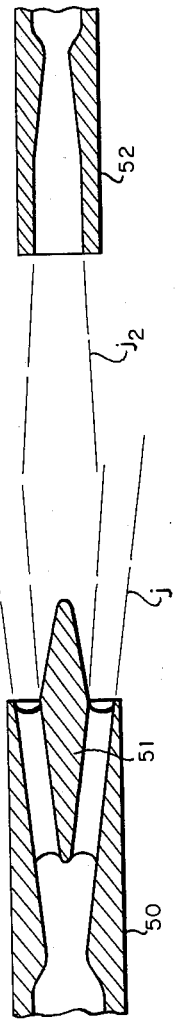
Fig. 2 is a longitudinal sectional view of alternative nozzles for the embodiment of Fig. 1.

In Fig. 2 I have shown a modified arrangement of opposed De Laval nozzles, arranged in direct opposition on a longitudinal axis, and it will be understood that these nozzles may be substituted for the nozzles 22 and 26 in the apparatus of Fig. 1. A De Laval nozzle 50, provided with a diffuser cone 51, like the nozzle 22 and cone 23 of Fig. 1, is provided at one end, and delivers an annular expanding jet or expanding gas annulus, such as indicated at $j$. Opposed thereto is a De Laval nozzle 52, without a diffuser cone, which delivers an expanding gas jet $j_2$, impinging on the hollow expanding jet $j$ on the inside thereof; and it will be understood that the degree of contact or interference may be adjusted, somewhat as in Fig. 1, by moving the nozzles 50 and 52 toward or from one another.

In Figs. 3 and 4 I have shown a modified form of equipment which may employ a sound chamber 10a generally similar to that of Fig. 1, but with modified end closures to accommodate an alternatve piping arrangement. Fig. 3 may be regarded, in fact, as a view taken in accordance with section line 3—3 of Fig. 1, but with certain modifications as now to be described. Enclosure head 12a is equipped to receive two gas pressure conduits 54 and 55, leading to sound generator unit 56; and opposite enclosure 13a has merely a gas outlet 32a. Otherwise, the chamber 10a may be identical with that of Fig. 1.

Sound generator 56 comprises a drum 57, arranged horizontally, with a sound discharge aperture 58 in its upper wall. Conduits 54 and 55 terminate in nozzles which communicate tangentially with the interior of drum 57, so that the gas flow streams introduced into the drum spin about the periphery thereof in opposed directions. The two tangential inlets may be at the same level, so that the gas streams meet within the drum with a completely head-on collision; or, as here shown, may be arranged at levels offset with respect to the drum axis, so that the gas streams counter-rotate side by side, but interfere laterally, so as to develop a continuous scrubbing action. The gas streams are thus, by impingement on one another, broken up into pressurized particles, which, by immediate expansion, generate sound in the general manner described in connection with earlier embodiments, or the above described shearing vortices may be made to predominate by having the two streams sufficiently offset. The sound is discharged via aperture 58, immediately over which the component to be tested will be understood to be suspended.

Fig. 5 shows a modification of the invention, which again can be incorporated in the sound chamber facility of Fig. 1. In this case, only one gas pressure conduit enters into the sound chamber, terminating in a straight nozzle 60. Positioned so as to intercept or split off and receive a portion of the gas jet $j_3$ issuing from nozzles 60 is the inlet end 61 of a recurvate pipe 62, which is curved around and terminates in a nozzle portion 63 aimed so that the gas jet $j_4$ issuing therefrom is directed in opposition to the jet $j_3$ and impinges, somewhat angularly, thereagainst. The degree of impingement may evidently be regulated by the angle and position of the nozzle 63. For example, the nozzle 63 may be more completely opposed to the portion of the jet $j_3$ that passes the inlet 61, or may be directed at a greater or lesser angle thereto. The embodiment of Fig. 5 thus illustrates the possibility of two nozzles or flows fed from a single pressure source, a portion of the jet issuing from a nozzle fed from the single pressure source being intercepted, turned back, and delivered as a second jet impinging against the first. Sound is again generated by reason of the impingement of the two jets on one another, by a mechanism similar to that described in the foregoing.

Fig. 6 shows a further modification of sound generator, which again may be used in the apparatus of Fig. 1. A single pressure source conduit 70 will be understood to be installed coaxially within one of the end closures of the sound chamber of Fig. 1, and this conduit 70 feeds the two parallel legs 71 of an U-shaped conduit structure generally designated by the numeral 72, the ends of the two legs being closed as indicated. Along the insides of the two legs and communicating with the interior thereof are spaced pairs of nozzles 73, the individual nozzles of each such pair being arranged at an obtuse angle to one another, whereby the jets $j_5$ issuing therefrom impinge on one another, in the manner clearly illustrated. Sound is again generated as a consequence of this impingement, in the manner heretofore described. It will be evident in Fig. 6 that the two jets of each impinging pair have a component of opposed relative flow velocity. Fig. 6 also shows the optional use of low frequency Helmholtz type resonators 74 positioned adjacent some of the issuing gas jets. These resonators may be of different frequency response, and are excited by the jet flows, with the effect of augmenting the low side of the frequency spectrum, which may in some cases be of advantage.

Fig. 7 shows an auxiliary device for the facility of Fig. 1, comprising a rotating siren chopper disk 80 provided with apertures 81 of random dimensions and spacings, which may be driven through shaft 82 from any suitable prime mover, and which may be positioned in a narrow break or gap 83 provided in either or both of the gas pressure conduits 20 and 21 leading into the sound chamber 10. The gap 83 in the gas pressure conduit 20 should be located as closely as possible to the jet fed thereby. This device introduces pulsations into the gas stream delivered to the jet, and is useful for the augmentation of certain sound frequencies, such as in the region of the low end of the spectrum. Randomness can be obtained by variation in hole spacing and hole sizes. It will be understood that the pulsations so created in the issuing jet introduce an additional variable factor in the impingement mechanism of the two jets against one another, with resulting increase in production of or emphasis on certain of the sound frequencies generated.

Fig. 8 shows another embodiment of sound generator in accordance with the invention, which may be used in a sound chamber facility such as shown in Fig. 1, or which alternatively can be used in an open room. Two gas pressure conduits 86 feed a pair of directly opposed nozzles 87 extending toward one another transversely across a pipe 88 closed at one end, as at 89, and formed at the other with a radiation horn 90. The nozzles may be of the De Laval type, but are here shown as straight. The component to be tested is positioned adjacent or within the horn. Sound is generated in the region between the opposed nozzles 87. It may be mentioned in connection with the straight type nozzles 87, that the jets issuing therefrom do not necessarily have the degree of expansion characteristic of jets issuing from De Laval expansion nozzles, so that the air particles formed by the impingement of the jets on one another are in a somewhat higher state of compression, with the result of producing a somewhat greater shock wave effect upon the expansion of these particles. A correspondingly higher degree of frequency content or distribution may thereby be achieved. Moreover, it should be recognized that other forms of my opposed jet generator may be used in combination with the horn. In all instances, the horn provides better acoustic loading on the source.

I have now shown and described a number of illustrative embodiments of the invention. It will be understood, however, that these are for illustrative purposes only, and that various additional forms and arrangements are possible within the scope of the invention as defined by the broader of the appended claims.

I claim:

1. For environmental sound applications, the method of generating destructive intensity level of multiple frequency sound characteristic of sound generated by jet propelled aircraft which comprises: orienting a plurality of jet flows of air or like fluid into mutually impinging relationship, and establishing the relative velocity of said jet flows, at a region of said impingement, with a value that is within the flight velocity range which is characteristic of jet propelled aircraft.

2. For environmental sound applications, the method of generating a destructive intensity level of multiple frequency sound characteristic of jet propelled aircraft which comprises: orienting a plurality of jet flows of air or like fluid in mutually impinging relationship, and establishing the relative velocity of said jet flows, at a region of said impingement, with a velocity value that is within the range of disproportionate increase of sound with increased velocity.

3. The method of claim 2, including directing the jets so that at least part of said impingement is characterized by at least portions of said jets travelling in mutual lateral scrubbing contact.

4. The method of claim 2 wherein a pair of jets are directed in substantially straight line opposition to one another.

5. The method of claim 2 wherein a pair of jets are directed along axes inclined toward one another.

6. The method of claim 2 wherein said jets are caused to have a degree of expansion before said impingement by causing said jets to flow through expansion nozzles.

7. A broad band environmental sound generator for generating destructive intensity level of multiple frequency sound characteristic of jet propelled aircraft comprises: a plurality of discharge nozzles for air or like fluid position so that the jets issuing therefrom impinge on one another, and conduit means for feeding said air to said nozzles at a pressure level which establishes the relative velocity of said jet flows, at a region of said impingement, with a velocity value that is within the range for said air of disproportionate increase of sound with increase of velocity.

8. The subject matter of claim 7, wherein a pair of nozzles are positioned in straight line opposition to one another.

9. The subject matter of claim 7, wherein a pair of nozzles are positioned on axes inclined toward one another.

10. The subject matter of claim 7, wherein said nozzles are De Laval expansion nozzles.

11. The subject matter of claim 7, wherein said means for feeding a high pressure gas includes a gas conduit supplying gas under pressure to one of said nozzles, and a recurvate pipe having at one end an inlet positioned to intercept a portion of the gas jet issuing from said one nozzle and having at the other end thereof another of said nozzles positioned to direct the gas jet issuing therefrom to impinge on said gas jet issuing from said one nozzle.

12. The subject matter of claim 7, wherein one nozzle of said plurality comprises a De Laval expansion nozzle with a diffuser cone axially positioned therein, whereby the gas jet issuing therefrom is in the form of an expanding annulus.

13. The subject matter of claim 7, wherein one nozzle of said plurality comprises a De Laval expansion nozzle with a diffuser cone axially positioned therein, whereby the gas jet issuing therefrom is in the form of an expanding annulus, and the other nozzle of said pair is a De Laval nozzle directing its gas jet within and against said expanding annulus.

14. The subject matter of claim 7, wherein one of said nozzles comprises a De Laval expansion nozzle with a diffuser cone axially positioned therein, whereby the gas jet issuing therefrom is in the form of an expanding annulus, and other of said nozzles are formed in a group spaced outside and about the longitudinal axis of said one nozzle, and are directed generally toward said one nozzle on inclined axes converging toward said longitudinal axis of said one nozzle.

15. The subject matter of claim 14, wherein the inclined axis nozzles are positioned so that the gas jets issuing therefrom scrub against the outer region of the expanding annulus of the gas jet issuing from said one nozzle.

16. The subject matter of claim 7, including also a drum, and wherein said nozzles comprise a pair of nozzles connected tangentially in opposite directions into said drum, in such arrangement as to deliver into said drum two opposed, counter-spinning gas streams directed to impinge on one another.

17. The subject matter of claim 16, wherein the points of tangential introduction of the gas streams into the drum are offset axially relative to the drum, whereby to establish two counter-rotating gas streams which scrub laterally against one another.

18. The subject matter of claim 7, wherein said means for feeding high pressure gas to the nozzles includes a gas conduit having a gap therein, and a rotating perforated siren disk operating in said gap to introduce pulsations into the gas stream passing across said gap.

References Cited in the file of this patent

UNITED STATES PATENTS

| 1,677,787 | Kerr | July 17, 1928 |
| 2,492,371 | Sivian | Dec. 27, 1949 |
| 2,782,632 | Klein et al. | Feb. 26, 1957 |

FOREIGN PATENTS

| 822,250 | Germany | Nov. 22, 1951 |